United States Patent [19]

Scholl et al.

[11] Patent Number: 5,972,402
[45] Date of Patent: Oct. 26, 1999

[54] PROCESS FOR ELIMINATING SMELL DEFECTS AND/OR OFF-FLAVORS IN FERMENTED OR NON-FERMENTED FRUIT JUICES, IN PARTICULAR WINE, FRUIT WINE OR FRUIT DISTILLATE PRODUCTS

[75] Inventors: Willy Scholl, Pfinztal; Heinz Eschnauer, Freigericht-Somborn, both of Germany

[73] Assignee: Erbslöhr-Getränke-Technologie GmbH & Co. KG, Germany

[21] Appl. No.: 08/930,090

[22] PCT Filed: May 14, 1996

[86] PCT No.: PCT/EP96/02056

§ 371 Date: Nov. 10, 1997

§ 102(e) Date: Nov. 10, 1997

[87] PCT Pub. No.: WO96/36690

PCT Pub. Date: Nov. 21, 1996

[30] Foreign Application Priority Data

May 16, 1995 [DE] Germany .............. 195 17 845

[51] Int. Cl.$^6$ .............. C12C 3/08; A23P 1/00; C12G 2/40; A23L 2/00
[52] U.S. Cl. .............. 426/422; 426/592; 426/599; 426/495
[58] Field of Search .............. 426/590, 592, 599, 422, 423, 495

[56] References Cited

U.S. PATENT DOCUMENTS 5,094,867  3/1992  Detering et al. .............. 426/271
5,624,534  4/1997  Boucher et al. .............. 426/494

FOREIGN PATENT DOCUMENTS 648 993    4/1985    Switzerland .
2706       of 1875   United Kingdom .............. 426/422

OTHER PUBLICATIONS

DIALOG database abstract (FSTA) for Weinwirtschaft-Technik, pp. 245–246. Author: H. Petrich, Sep. 1983.

Database WPI, Section Ch, Week 3184, Derwent Pub. Ltd., London, GB, AN 81–79127d, XP002014098 & SU, A, 800 190 (Moscow Nat. Economy Inst.) Apr. 19, 1979.

Database Abstract. AN 73(05):H0758 FSTA for Wein–Wissenschaft, 27 (9/10), pp. 250–253, 1972.

*Primary Examiner*—Anthony J. Weier
*Attorney, Agent, or Firm*—Dick and Harris

[57] ABSTRACT

To eliminate from non-fermented or fermented fruit juices obtained from fruit or grapes, in particular wine, the undesirable odors and/or taste caused by sulphur or sulphur compounds, called "Böckser", it is proposed according to the invention to add hardly soluble or insoluble organic Cu-compounds to the liquid, which, by reacting with the sulphur or sulphur compounds, form insoluble sulphides that can easily be separated from the liquid by precipitation. Particularly suitable for this are copper salts of citric acid, tartaric acid, malic acid or stearic acid or mixtures of these salts.

18 Claims, No Drawings

PROCESS FOR ELIMINATING SMELL DEFECTS AND/OR OFF-FLAVORS IN FERMENTED OR NON-FERMENTED FRUIT JUICES, IN PARTICULAR WINE, FRUIT WINE OR FRUIT DISTILLATE PRODUCTS

This is a National Stage application under 35 USC 371 of PCT/EP96/02056 filed May 14, 1996.

BACKGROUND OF THE INVENTION

1. The Technical Field

The invention relates to a process for eliminating from non-fermented or fermented fruit juices obtained from fruit or grapes, in particular wine, fruit wine or fruit distillates, undesirable odors and/or tastes which are caused by the formation of sulphur compounds, in particular hydrogen sulphide.

2. The Prior Art

During the reductive fermenting of fruit juices, hydrogen sulphide and other sulphur compounds occur. The resultant adverse effect on the aroma and taste of the fermentation products, called "Böckser" ("Böckser"=the German term for the unpleasant odor and taste caused by hydrogen sulphide), is unpleasant and persistent.

Various treatment methods and cellar measures are known to remove the "Böckser", such as adsorption on bentonites or activated charcoal, aeration, filtration. However, these processes have the disadvantage that their use has a considerable adverse effect on the quality of the wine.

Also known is the use of copper sulphate, which is allowed as a food additive, to remove the "Böckser". The excess copper must then be removed by precipitation with potassium hexacyanoferrate-II. Such a treatment is environmentally harmful, extremely labor intensive and outmoded.

To remove the "Böckser", it is also known to mix the fermentation products with electrolytically precipitated metal ions, preferably Ag-ions which, with the substances in the liquid that cause the undesirable odors and taste, form insoluble salts. This method, known as the catadyn process, results in harmful Ag-ions in the wine. This process is at best suitable for alcohol distillates.

It is the object of the invention to eliminate the aforementioned disadvantages that occur during the removal of the "Böckser" and to indicate an environmentally friendly process.

DETAILED DISCLOSURE OF THE INVENTION

According to the invention this object is addressed by the characterizing features of claim 1 in that organic Cu-compounds are added to the fruit juices, wine, fruit wine or fruit distillates, which Cu-compounds are hardly soluble or insoluble in water as well as in non-fermented and fermented fruit juices, wine, fruit wine or fruit distillates and which, by reacting with the sulphur compounds, form insoluble sulphides that are separated from the liquid by precipitation. The insoluble sulphides formed when organic copper compounds react with the to be removed sulphur compounds can easily be separated from the wine, fruit wine, fruit distillates or fruit juices as insoluble solids.

Hardly soluble or insoluble copper salts of citric acid, tartaric acid, malic acid, stearic acid or lactic acid, which have the advantage that they are suitable food additives and not harmful from an ecological point of view, have proved particularly suitable for the process according to the invention.

Preferably, copper salts of monovalent or multivalent carboxylic acids, e.g. copper stearate, copper citrate, copper malate, copper tartrate, copper lactate are used, which react with the sulphur compounds to form insoluble copper sulphide.

Also mixtures of the above-mentioned salts can be used with the same advantage. A particularly good efficacy is obtained when the copper compounds are used in combination with adsorption agents or filter aids, in which connection bentonites are particularly suitable as adsorption agents. They have a high swelling ability and good ion exchange ability and serve to agglomerate the copper compounds.

The crushed bentonite compound can be impregnated with soluble copper salts and then be acted upon with carboxylic acids to form the insoluble carboxylate.

For the implementation of the process according to the invention it is advantageous to mix granulates of aqueous suspensions of bentonite with copper carboxylates that are obtained, for example, by spray drying.

Also activated charcoal, possibly combined with bentonite, can be used as adsorption agent.

In the following the invention will be described with reference to an example: 5 g of pure copper citrate are mixed with 95 g bentonite. The granulated mixture is introduced into 1000 l wine contaminated with "Böckser" and stirred for about 2 hours. After the precipitation the wine is siphoned off and filtered. The organoleptic test showed a perfect drinking quality of the previously undrinkable wine.

We claim:

1. A process for the elimination, through addition of Cu compounds, of undesirable odors and tastes from non-fermented or fermented fruit juices obtained from fruit or grapes, the cause of which lies in the formation of sulfur compounds, characterized in that one or more organic Cu compounds, which are hardly soluble or insoluble in water, as well as in non-fermented and fermented fruit juices, wine, fruit wine, or fruit distillates, are added to the non-fermented or fermented fruit juices, wine, fruit wine, or fruit distillates, and which, by reacting with the sulfur compounds in said non-fermented or fermented fruit juices, wine, fruit wine, or fruit distillates, insoluble sulfides are formed which are then separated from the non-fermented or fermented fruit juice, wine, fruit wine, or fruit distillate, by precipitation, wherein the Cu compounds used are hardly soluble or insoluble copper salts of monovalent or multivalent carboxylic acids.

2. A process according to claim 1, characterized in that the one or more Cu compounds used comprise one or more monovalent or multivalent copper salts, from the group consisting of copper stearate, copper citrate, copper malate, copper tartrate, copper lactate, mixtures of these salts.

3. A process according to claim 1, characterized in that the Cu compounds are used together with absorption agents.

4. A process according to claim 3, characterized in that bentonite, which is used as a granulate, is mixed with copper salts and is then exposed to carboxylic acids.

5. A process for eliminating undesirable odors and off-flavours from a liquid selected from the group consisting of non-fermented and fermented fruit juices from fruits and from grapes, wine, fruit wine and fruit distillates, wherein the cause of said odors and off-flavours lies in the formation of Böckser, wherein one or more organic Cu-compounds which are hardly soluble or insoluble in water and in non-fermented fruit juices, fermented fruit juices, wine, fruit wine and fruit distillates, are added to said liquid for forming insoluble sulfides, and wherein said insoluble sulfides are separated from said liquid by precipitation.

6. A process for eliminating undesirable odors and off-flavours from a liquid selected from the group consisting of non-fermented and fermented fruit juices from fruits and from grades, wine, fruit wine and fruit distillates, wherein the cause of said odors and off-flavours lines in the formation of Böckser, wherein one or more organic Cu-compounds which are hardly soluble or insoluble in water and in non-fermented fruit juices, fermented fruit juices, wine, fruit wine and fruit distillates, are added to said liquid for forming insoluble sulfides, and wherein said insoluble sulfides are separated from said liquid by precipitation, said organic Cu-compounds are selected from the group consisting of copper salts of carboxylic acids.

7. A process according to claim 6, wherein said copper salt of carboxylic acid is selected from the group consisting of copper stearate, copper citrate, copper malate, copper tartrate, copper lactate and mixtures thereof.

8. A process according to claim 6, wherein said organic Cu-compound is used together with an absorption agent.

9. A process according to claim 6, wherein said Cu-compound is used together with an absorption agent.

10. A process according to claim 9, wherein said absorption agent is bentonite.

11. A process according to claim 10, wherein said bentonite is used as a granulate and wherein said granulate is impregnated with a soluble copper salt and exposed to a carboxylic acid.

12. A process according to claim 3, wherein said absorption agent is bentonite.

13. A process according to claim 5, wherein said organic Cu-compounds are selected from the group consisting of copper salts of carboxylic acids.

14. A process according to claim 13, wherein said copper salt of carboxylic acid is selected from the group consisting of copper stearate, copper citrate, copper malate, copper tartrate, copper lactate and mixtures thereof.

15. A process according to claim 5, wherein said organic Cu-compound is used together with an absorption agent.

16. A process according to claim 13, wherein said Cu-compound is used together with an absorption agent.

17. A process according to claim 16, wherein said absorption agent is bentonite.

18. A process according to claim 17, wherein said bentonite is used as a granulate and wherein said granulate is impregnated with a soluble copper salt and exposed to a carboxylic acid.

* * * * *

UNITED STATES PATENT AND TRADEMARK OFFICE
CERTIFICATE OF CORRECTION

PATENT NO : 5,972,402
DATED : October 26, 1999
INVENTOR(S) : Willy Scholl and Heinze Eschnauer It is certified that error appears in the above-identified patent and that said Letters Patent are hereby corrected as shown below:

Column 3, Line 4                     Change "grades" to --grapes--

Signed and Sealed this

Seventeenth Day of April, 2001

Attest:

NICHOLAS P. GODICI

Attesting Officer        Acting Director of the United States Patent and Trademark Office